United States Patent [19]

Seimiya et al.

[11] Patent Number: 4,467,333
[45] Date of Patent: Aug. 21, 1984

[54] COPYING APPARATUS

[75] Inventors: Ryubun Seimiya; Shigeru Inowa, both of Hino; Noriyoshi Tarumi, Hachioji; Masahiko Matsunawa, Hachioji; Hiroshi Tokunaga, Hachioji, all of Japan

[73] Assignee: Konishiroku Photo Industry Co., Ltd., Tokyo, Japan

[21] Appl. No.: 247,020

[22] Filed: Mar. 24, 1981

[30] Foreign Application Priority Data

Mar. 29, 1980 [JP] Japan .................................. 55-40996

[51] Int. Cl.³ .......................................... G01D 15/06
[52] U.S. Cl. ..................................... 346/154; 346/159
[58] Field of Search ................... 346/153.1, 157, 159, 346/160.1, 154; 358/300

[56] References Cited

U.S. PATENT DOCUMENTS

3,673,598  6/1972  Simm et al. ........................ 346/159
3,863,261  1/1975  Klein ................................. 346/159
4,251,153  2/1981  Levine .............................. 358/300

Primary Examiner—Thomas H. Tarcza
Attorney, Agent, or Firm—Jordan B. Bierman; Linda Bierman

[57] ABSTRACT

A copying machine comprising an image signal generating unit including a solid image pickup element for converting an optical image into an electric signal; an ion generating source; and an electrostatic image forming unit including an ion control electrode. The ion control electrode has a control electrode and a common electrode arranged to face each other through an insulating layer and formed with fine openings arranged in a row or in plural adjacent rows. At least one of the electrodes being divided into such a plurality of blocks as has its one or plural openings electrically insulated at a close spacing across the aforementioned arranged openings and as are wired to receive electric signals from the aforementioned image signal generating unit, the common electrode being operative to control the flow of ions, which are directed toward a charge holder, if necessary, together with the control electrode in response to a bias voltage applied. A reference voltage corresponding to the color to be recorded is preset so that the voltage corresponding to the difference between the reference voltage and the signal voltage is applied to the control electrode of the ion control electrode.

5 Claims, 24 Drawing Figures

COPYING APPARATUS

BACKGROUND OF THE INVENTION

1. Field of the Invention

The present invention relates to a novel copying machine, more particularly to a copying machine which is free from any drawback concomitant with copying machines according to the prior art, which has its performance remarkably improved and which has such additional functions as have failed to be incorporated in copying machines according to the prior art.

2. Description of the Prior Art

A copying machine has been developed from the era of the so-called "limited number of copies", in which the copying operation using salts of silver or diazo formed the principal trend, to the era of the so-called "great number of copies", in which there is used a copying machine called an electrophotographic copying machine using electrophotography having such a high degree of completeness as a general business copying machine that it can enjoy the following advantages: that copies can be instantly obtained; that the copying speed is high; that the storability of the copies is excellent; that originals are not selected; and that usual paper can be used.

The electrophotographic copying machine is able to have high completeness and marketability and is widely used as the main source of the copying machine because it not only the uses the copying process which was invented by Carlson in 1938, but also because of the subsequent developments of the materials such as photosensitive materials or developing agents, the process such as a charging, developing or transferring process, and the practical marketing techniques.

An electrophotographic copying machine is constructed by the method which will be described hereinafter. The electrophotographic copying machine is characterized by using means such as an insulating photoconductive member for the photosensitive member which has an insulating property capable of holding electrostatic charges in the dark, which can receive electric charges and which is rendered electrically conductive when exposed to a light. First of all, in the dark, a corona charger, in which a thin wire called a corona wire and made of tungsten is extended under tension along a grounded plate, for example, is used to apply a high voltage between the wire and the conductive base of the photosensitive member so that the surface of this photosensitive member is wholly charged with a positive or negative polarity to provide it with photosensitiveity. Then, an optical image corresponding to the picture image of an original is focused on the aforementioned photosensitive member, thus charged by means of an optical system which is composed of a light source, a lens and a reflecting mirror, so that the charges are placed upon the surface of the photosensitive member in accordance with the quantity of the irradiating light, thereby to convert the optical image of the picture image of the original into an electrostatic image.

The electrostatic image thus formed on the photosensitive member is developed and visualized by the well known electrophotographic development.

Now, the conventional copying machine thus far described is widely used but has various drawbacks and functional limits, as follows:

The optical system is complex and requires a large space so that problems arise in the compactness and cost of the copying machine, in case a copy board is fixed to improve the operability.

If the sensitivity of the photosensitive meaner is increased with a view to increasing the copying speed, the reduction in the image density for a continuously copying operation and the establishment of fog are liable to take place so that the picture image becomes instable.

Upon production of the photosensitive member, on the other hand, the desired characteristics are liable to disappear, and the yield is deteriorated to raise the cost.

It is difficult to preset the process condition for improving or stabilizing the picture image.

The conventional copying machine is a single-function machine having nothing but a copying function, and it is difficult to provide hybrid functions including that of recording the signal from a communication line in addition to the copying function.

SUMMARY OF THE INVENTION

It is, therefore, an object of the present invention to provide a copying machine which is free from the drawbacks inherent in the conventional copying machine thus far described, and one which is easily capable of handling hybrid functions.

The copying machine according to the present invention will be described in the following.

The copying machine according to the present invention is characterized by the fact that it is composed of an image signal generating unit, an electrostatic image forming unit and a signal processing unit. The image signal generating unit is a unit, in which the picture image light from an original is focused upon a solid image pickup element by means of an optical system including a light source, a lens and a mirror, for example, thereby to convert the optical image into electric signals, and is composed of the optical system, the solid image pickup element, a drive circuit of the solid image pickup element, and an amplifier.

The solid image pickup element usually uses an element having a one-dimensional construction, and there has been developed in addition of the image sensor of MOS type the so-called "CCD (Charge Coupled Device)" which can be subjected to analog transfer with excellent transfer efficiency and frequency characteristics so that it is suitable for the practice of the present invention.

The CCD especially suitable for the present invention can be found, while taking the large number of the picture elements, the sensitivity and transferring speed into consideration, in the following products:

Nippon Denki KK: $\mu$PD 792 D

Les Chum: CCPD 1728

Fairchild: CCD 121 HC, CCD 142, 143

These examples of a CCD are featured by that they can include a light receiving unit, that they have a function of photoelectric conversion—charge storage—transfer, and that they makes the conversion from the light into the voltage in an analog quantity by having a built-in output amplifying unit.

In the CCD, the storage of optical information from the original into the light receiving unit is performed as the quantity of charge in parallel, a voltage is applied upon the transfer gate between the light receiving unit and the shift transistor thereby to move the charges to the shift transistor, and a shift register clock signal is fed to make the serial transfer possible so that the charges transferred are converted into a voltage by the output amplifying unit and are taken out as a voltage signal. If the subsequent optical information is fed to the light receiving unit while the serial transfer is being performed in the shift register, continuous operations are made possible so that the picture image of the original can be wholly taken out as a voltage signal in a continuous manner.

Other objects and features of the present invention will be made apparent from the following description taken along with the accompanying drawings.

DESCRIPTION OF THE PREFERRED EMBODIMENTS

Figure 1:
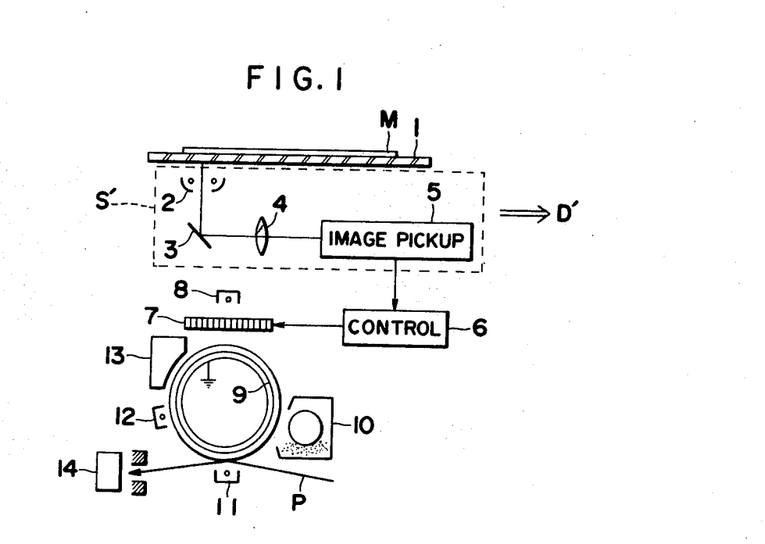
FIG. 1 is a schematic view showing a copying machine according to the present invention.

FIG. 1 is a view diametrically showing the present invention.

As shown, the image of an original M placed on a copy board 1 is scanned by moving a scanning unit S', which is composed of an illuminating lamp 2, a mirror 3, a lens 4 and a solid image pickup element 5, in the direction of arrow D'.

The image signal, which is converted into an electric signal by the solid image pickup element 5, is processed by a control circuit 6 and is fed to an ion control electrode 7. This ion control electrode 7 controls the passage of the ion flow from a corona discharger 8 in accordance with the image signal, as will be described later. The ions, which have been controlled by the ion control electrode 7, arrive at a charge holder 9 so that an electrostatic image according to the image of the original M is formed on the charge holder 9.

The resultant electrostatic image is developed by a developer 10 and is transferred by a transfer corona electrode 11 to copy paper P so that the image transferred is fixed by means of a fixer 14. After the transfer, the electrostatic image on the charge holder 9 is erased by a charge removing corona electrode 12, and the residual toner is cleaned off by the action of a cleaner 13.

Figure 2:
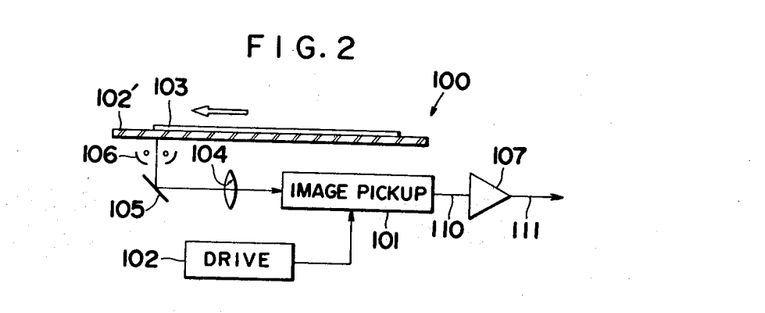
FIG. 2 is a view showing one example of the image signal generating unit of the copying maching according to the present invention.

FIG. 2 shows the image signal generating unit according to the present invention.

In FIG. 2, reference numeral 100 indicates the image signal generating unit. The image of an original 103 on a copy board 102' is focused upon a linear solid image pickup element 101 by the action of an optical system which is composed of a light source 106, a mirror 105 and a lens 104. The solid image pickup element 101 is driven by the clock signal coming from a drive circuit 102 so that the picture image of the original 103 is wholly fed out as a video signal 110 in response to the movement of the copy board 102'. The video signal 110 has its voltage suitably amplified by an amplifying unit 107 and is fed out as a voltage video signal 111.

Figure 3:
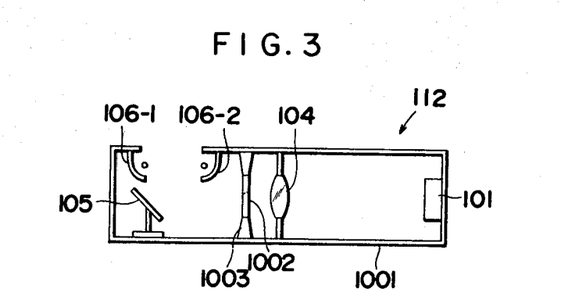
FIG. 3 is a view showing one example of an original scanning unit.

FIG. 3 shows one example of the arrangement, in which the optical unit composed of the lamp 106, the mirror 105 and the lens 104 and the solid image pickup element 101 both being shown in FIG. 2 are integrated into a unit 112 and are moved together so that the image of the original 103 is consecutively focused on the solid image pickup element 101 and in which the copy board 102' is fixed to improve the operability.

More specifically, the unit 112 is composed of a casing 1001, which is partitioned by a partition 1003 having a glass plate 1002 into a compartment, in which lamps 106-1 and 106-2 and the mirror 105 are accommodated, and a compartment in which the lens 104 and the solid image pickup element 101 are accommodated. The latter compartment is so sealed by said partition as to prevent dusts or the like from being caught by the solid image pickup element.

Figure 4:
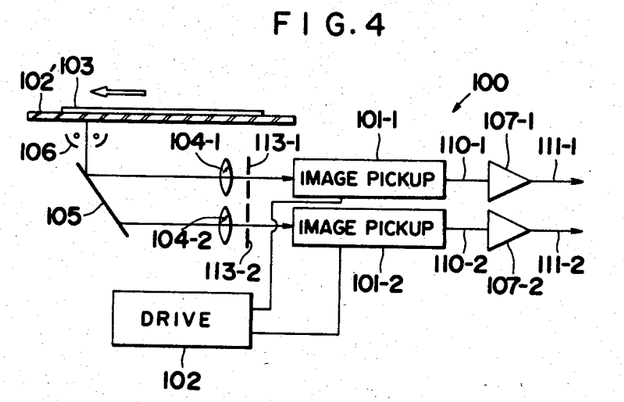
FIG. 4 is a view showing another example of the image signal generating unit of the copying machine according to the present invention.

FIG. 4 shows a concrete example of the image signal generating unit in which a plurality of the solid image pickup elements are used with the view to improving the image quality such as the resolution, in the case when a video signal from the linear solid image pickup element is to be visualized.

In a manner to correspond to two solid image pickup elements 101-1 and 101-2, there are provided lenses 104-1 and 104-2 which divide the image of the original 103 into two halves and suitably focus the same upon two solid image pickup elements 101-1 and 101-2. The video signals 110-1 and 110-2 from the solid image pickup elements 101-1 and 101-2 are suitably amplified by amplifiers 107-1 and 107-2, respectively, and are fed out as voltage video signals.

In FIG. 4, incidentally, the correction of the solid image pickup elements 101-1 and 101-2 can be performed by making variable the slits or irises 113-1 and 113-2, which are attached to the lenses 104-1 and 104-2, respectively, so that the quantity of the light irradiating the solid image pickup elements is adjusted or so that the outputs of the amplifiers 107-1 and 107-2 are adjusted.

Figure 6:
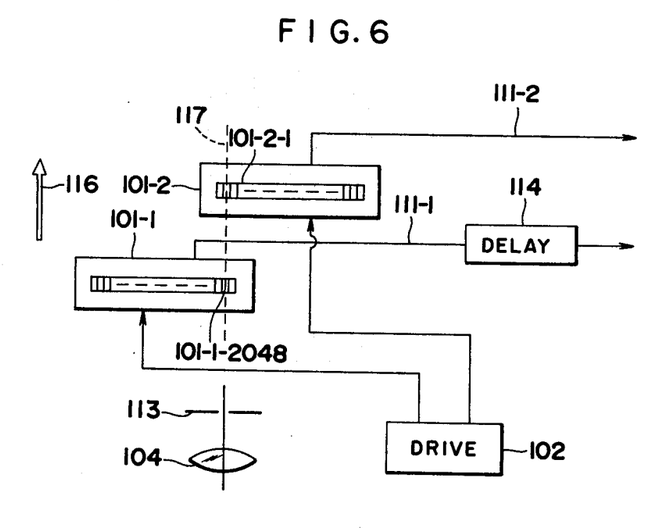
FIG. 6 is a view showing a further example of the image signal generating unit.

FIG. 6 shows arrangements for the solid image pickup elements in the case when one lens 104 is used, whereas the solid image pickup elements used are plural, as is different from the example of FIG. 4.

The respective solid image pickup elements are arranged/zigzag. In the solid image pickup element 101-1 shown in FIG. 6, it is preferred that the picture element 101-1-2048 at the end portion, which is exposed to the image light so that it is transferred, is arranged to partially overlap the picture element 101-2-1 at the end portion in the solid image pickup element 101-2, which is to be similarly transferred. Numeral 116 indicates the moving direction of the image light, to be irradiated upon the solid image pickup elements 101-1 and 101-2, and a broken line 117 indicating the position of arrangement has a relationship in parallel with the moving direction 116 of the image light. The image light coming from the image positioned on the original 103 and corresponding to the moving directions of the image, passes on more quickly the respective solid image pickup elements 101-1 than on the element 101-2, as shown in FIG. 6. Therefore, if the output 111-1 of the solid image pickup element 101-1 is fed out through a delay circuit 114, then it would be advantageous in the case when the signals from the respective solid image pickup elements are to be visualized.

Although, in FIG. 4, the two solid image pickup elements 101-1 and 101-2 feed out the voltage signals 111-1 and 111-2, respectively, it is possible to sum the voltage video signals 111-1 and 111-2 and for feed then as a signal 111-3.

Figure 5:
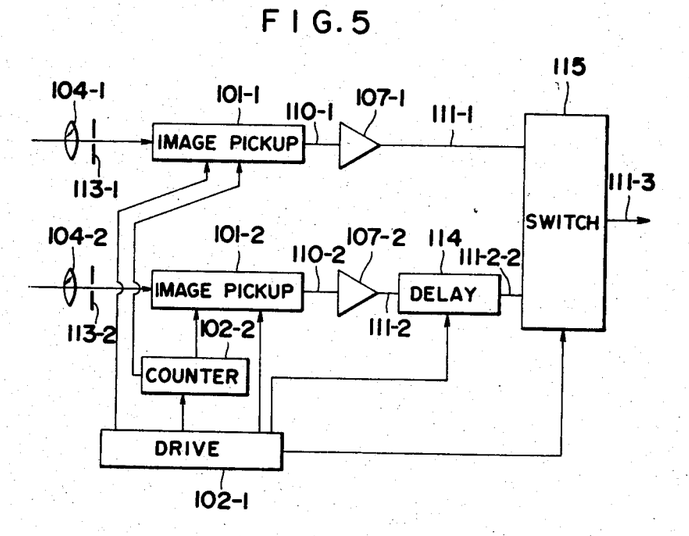
FIG. 5 is a view showing still another example of the image signal generating unit.

FIG. 5 shows one example of the above operation. In FIG. 5, in the respective outputs 111-1 and 111-2 of the solid image pickup elements 101-1 and 101-2 which are arranged in the order in the line direction, i.e., in the output direction of the shift register, the output 111-2 is delayed by the delay circuit 114 to a time period, during which the shift register of the solid image pickup element 101-1 accomplishes the image scanning operation of one line, and is fed out as the voltage signal 111-2-2 so that the voltage signals 111-1 and 111-2-2 can be composed as a single voltage signal 111-3 by the action of a switching circuit 115. The solid image pickup elements 101-1 and 101-2 are driven by the clock signal coming from the drive circuit 102-1.

Incidentally, the output signals from the solid image pickup elements 101-1 and 101-2, respectively, are alternately fed out for each scanning group and are alternately controlled by the clock signal from the counter 102-2 so that they may be fed, as a whole, as the serial video signal 111-3 out of the switching circuit 115.

The electrostatic image forming unit is a unit, in which the voltage video signal fed out of the aforementioned image signal generating unit is converted into an electrostatic image to be fed to an electrostatic recorder, and is composed of an ion generator, an ion control electrode and an electrostatic recorder. The ion generator is a device for establishing an ion flow to the electrostatic recorder and uses, as an example, a device which is so shaped that a tensile corona wire is extended along the grounded plate. Thus, the ion generator can generate the ion flow to the electrostatic recorder by applying a high voltage between the corona wire and the electrostatic recorder.

In one concrete example of the ion control electrode, electrode plates having electrodes facing each other through an insulating layer are formed with fine openings which are arranged linearly in a row or in a plurality of closely adjacent rows, and at least one of the electrode plates has its one or plural openings divided into electrially insulated units across the aforementioned rows and at a close spacing such that the respective units are so wired as to consecutively receive electric signals. The openings thus formed constitute such an electric aperture as controls the ion flow, which is directed from the ion generator to the electrostatic recorder, in accordance with the voltage applied between the electrodes. Usually, a lower voltage than that applied upon the ion generator is applied to the ion control electrode. By consecutively feeding the voltage signal to the respective units of the openings having the wirings thus far described, there is formed at the opening portion an electric aperture according to the voltage signal thereby to control the ion flow from the ion generator to the electrostatic recorder so that the electrostatic pattern according to the voltage signal fed to the respective opening units is formed on the electrostatic recorder.

As a result, there is provided an arrangement for effecting conversion into the electrostatic image by amplifying the voltage signal coming from the aforementioned image signal generating unit to a voltage level sufficient to effect the control of the ion flow and by feeding the amplified voltage signal to the ion control electrode.

A concrete example of the electrostatic image forming unit will be described in the following with reference to the accompanying drawings.

Figure 7:
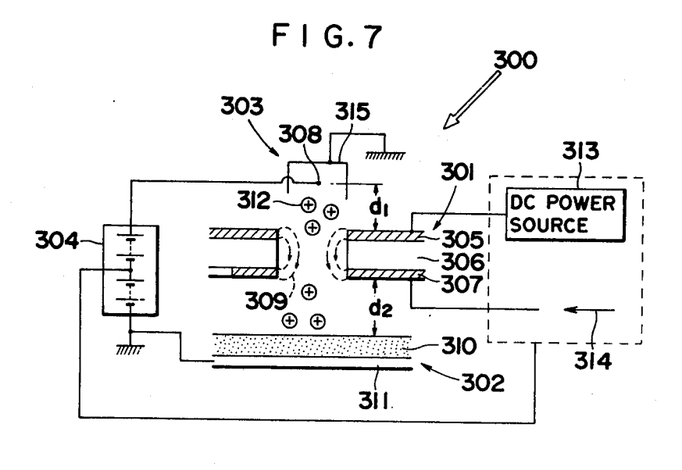
FIG. 7 is a view showing one example of an ion control unit of the copying machine according to the present invention.

FIG. 7 shows one concrete example of the electrostatic image forming sunit. Numeral 303 indicates the ion generator which is equipped with a corona wire 308 surrounded by a grounded plate 315. The corona wire 308 usually consists of a tungsten wire having a diameter of 40 to 100 $\mu$. Numeral 301 indicates a concrete example of the construction of the ion control electrode, in which a common electrode 305 and a control electrode 307 are arranged to face each other through an insulating layer 306 and in which an aperture 309 is formed just below the corona wire of the ion generator 303. The electrodes 305 and 307 are usually made of Cu or Al. On the other hand, the insulating layer 306 may be an air layer or a film of an insulating high molecular polymer, preferably, a polyimide film or a polyester film. The thicknesses of the electrode layer 305 and 307 and the insulating layer 306 are preferred to be as small as possible so as to effectively impart the ion flow to the electrostatic recorder. For example, it is preferred that the electrode layers 305 and 307 have a thickness of 0.5 to 100 $\mu$ whereas the insulating layer 306 has a thickness of 5 to 200 $\mu$.

Numeral 302 indicates the electrostatic recorder which is composed of a dielectric layer 310 and a conductive layer 311. The dielectric layer 310 may be made of an insulator such as an organic high polymer, a material prepared by dispersing an inorganic pigment into an organic high polymer, or an insulating photoconductor acting as an electrophotographic photosensitive material. The insulating photoconductor has the advantage that the recorded electrostatic image recorded can be easily erased, when intended so, by being exposed to a light. The thickness of the dielectric layer preferably ranges from 5 to 200 μ in dependence upon the kind of the dielectric material used.

In FIG. 7, a high positive voltage is applied by the high voltage power source 304 between the corona wire 308 and the conductive layer 311 of the electrostatic recorder 302. Moreover, the ion control electrode 301 is interposed between the ion generator 303 and the electrostatic recorder 302. The common electrode 305 of the ion control electrode 301 is positioned on the side of the ion generator 303 and is connected with a DC power source 313 so that it is fed with a DC bias. The control electrode 307 is fed with a voltage signal 314 and forms an electric aperture within the aperture 309 by the potential difference from the common electrode 305 thereby to control the ion flow from the ion generator 303 to the electrostatic recorder 302. On the other hand, the DC power source 313 and the voltage signal 314 as well as the ion control electrode 301 are at high potentials with respect to the conductive layer 311 of the electrostatic recorder 302 so as to effectively guide the ion flow 312 to the electrostatic recorder 302. It is preferred that the DC power source 313 and the voltage 314 are usually at a high voltage of 500 to 3000 V with respect to the conductive layer 311 of the electrostatic recorder 302.

In order to sufficiently guide the ion flow to the electrostatic recorder 302, both the distance $d_1$ between the corona wire 308 and the ion control electrode 301 and the distance $d_2$ between the ion control electrode 301 and the electrostatic recorder are preferably as amall as possible. The preferred ranges of the distances $d_1$ and $d_2$ are 2 to 20 mm and 0.2 to 5 mm, respectively.

In the electrostatic image forming unit 300 having the construction thus far described, the ion control electrode 301 and the electrostatic recorder 302 are relatively moved across the aperture 309, which is operative to control the ion flow, so that the electrostatic image corresponding to the picture image of the original is formed on the electrostatic recorder 302.

Figure 8:
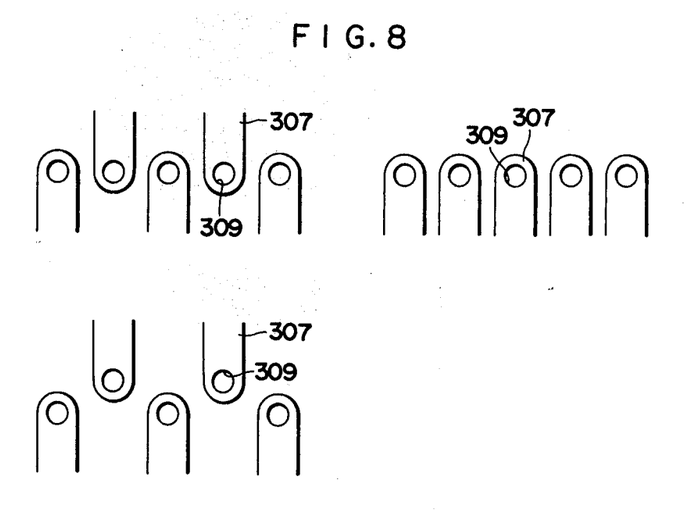
FIG. 8 is a view showing the arrangement of openings in an ion control electrode.

FIG. 8 shows the wiring of the control electrode 307 of the ion control electrode. The wiring pattern of the aperture 309 is determined by the resolution of the electrostatic image, which is formed on the electrostatic recorder 302 as a result of the passage of the ion flow through the aperture 309, by the recording speed and by the workability of the electrode plates forming the ion control electrode. It is necessary that the density of the aperture be 50 to 500 meshes and that the open percentage is at least 30%.

Figure 14:
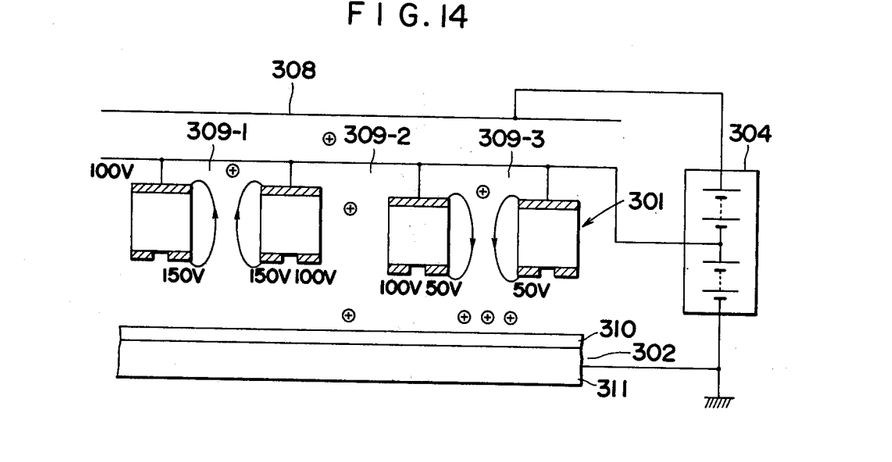
FIG. 14 is a view showing the ion control mode of the ion control electrode.

FIG. 14 shows the operations of the ion control electrode.

In FIG. 14, a high positive voltage is applied by a high voltage power source 304 between the corona wire 308 and the conductive layer 311 of the electrostatic recorder 302 so that the positive ions generated are directed toward the electrostatic recorder 302. A high positive voltage is also applied between the ion control electrode 301 and the conductive layer 311 of the electrostatic recorder 302. In the aperture 309 of the ion control electrode 301 of FIG. 14, the electric field toward the electrostatic recorder 302 has a potential of −50 V at 309-1, a potential of 0 V at 309-2 and a potential of +50 V at 309-3. At 309-1, the electric field is directed to obstruct the flow of the positive ions so that the ions will not flow toward the electrostatic recorder. At 309-3, however, the electric field is directed to promote the flow of the positive ions so that the electrostatic charge pattern is formed on the electrostatic recorder.

The signal processing unit processes the video signal coming from the solid image pickup element and further the video signal coming from the outside of the copying machine thereby to form an electrostatic image upon the electrostatic recorder of the electrostatic image forming unit in accordance with the picture image of the original. The signal processing unit further operates to drive the ion control electrode in a suitable manner thereby to improve the image quality and the writing speed and to perform the image control such as the enlargement or contraction of the electrostatic image, the adjustment of the image density or the fog, or the reversal of the image.

In order to adjust the contrast of the electrostatic image formed on the charge holder thereby to eliminate the fog, it is sufficient partly to detect the background of the video signal from the solid image pickup element thereby to detect the difference from the signal level and partly to amplify the video signal when the difference detected is small. This will be described with reference to FIGS. 9 to 12.

Figure 9:
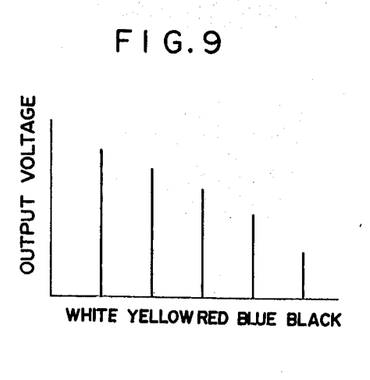
FIG. 9 is a graph showing the output of a solid image pickup element corresponding to the color of the original.

As shown in FIG. 9, the CCD feeds out different ouputs for the respective colors of the original in case the illumination is performed by the use of a halogen lamp. In case, when it is intended to copy the picture image of an original, the difference in the outputs from the photoelectric converting element is relatively small as for the original bearing black letters and a red background, there arise problems that the fog takes place all over the copied picture image and that the contrast is degraded. On the other hand, the ion control electrode in constructed such that the insulating layer is interposed between the paired electrodes, one of which is used as a common electrode and the other of which is used as a control electrode. This control electrode is fed with electric signal information thereby to control the flow rate of the ions, which are generated by the ion generating source, through the ion control electrode so that the electrostatic image corresponding to the electric signal information is formed on the charge holder.

Figure 10:
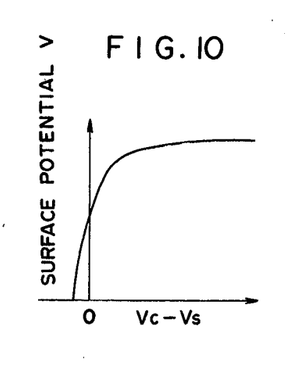
FIG. 10 is a graph showing the relationship between the control voltage of the ion control electrode and the surface potential of a charge holding member.

In case the ion control electrode is used, the surface potential V of the charge holder has such a relationship with the potential difference $|V_C - V_S|$ between the potential $V_S$ of the control electrode and the potential $V_C$ of the common electrode as is shown in FIG. 10.

In view of the facts thus far described, the embodiment to be described intends to control either the voltage at the control electrode in order to prevent the fog and the reduction in the contrast of the recorded picture image in case of difference between the outputs of the background and the picture image is small.

Figure 11:
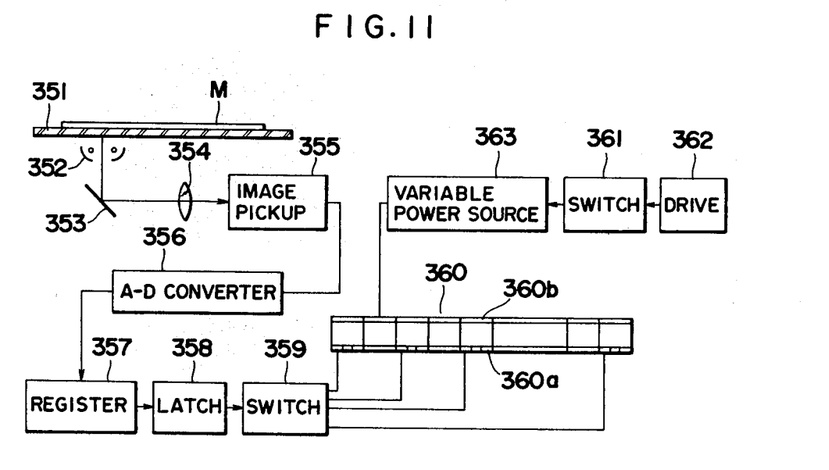
FIGS. 11 and 12 are views showing an example of the image signal generating unit having fog preventing and contrast adjusting functions.

FIG. 11 shows an embodiment which is enabled to make the fog prevention and the contrast adjustment.

As shown, the original M is placed on a copy board 351, and this copy board 351 is moved. The original M is illuminated by an illuminating lamp 352 so that the reflected light from the original M is converted into an electric signal by the action of a solid image pickup element 355 such as the CCD through a mirror 353 and a lens 354. The electric signal information thus obtained is converted into a digital signal by a signal processing circuit 356 and is fed to the control electrode 360a of an ion control electrode 360 through a shift register 357, a latch circuit 358 and a switching circuit 259. If, on the other hand, the voltage level to be fed from a variable voltage power source 363 to the common electrode 360b of the ion control electrode 360 is switched by the action of a voltage change-over switch 361, the reduction in the contrast can be prevented whatever color of the background of the original M may be. The voltage change-over switch 361 has its drive portion 362 driven by a drive signal for controlling the fog and the contrast.

In order to prevent the fog, incidentally, the color of the original is detected to adjust the potential difference $|V_C - V_S|$, which corresponds to the background of the original, to a certain value of $|V_C - V_S|B$. This value $|V_C - V_S|B$ is such a value as establishes a surface potential $V_B$ of the insulator to an extent to prevent the toner from being caught on the charge holder as a result of the development and is determined in accordance with the developing condition (e.g., the developing bias).

Figure 12:
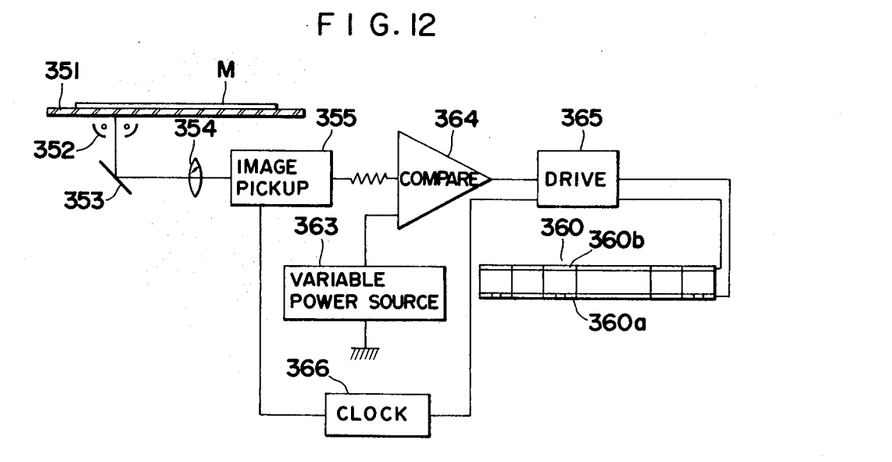

A further example shown in FIG. 12 is one, in which the voltage of the control electrode is controlled and in which reference numerals similar to those in FIG. 11 indicate the same constituting parts.

When it is intended to record not white and yellow colors but red, blue and black colors in case the photoelectric converting element having such an output ration as is shown in FIG. 9, a reference voltage is preset by the variable voltage source 363 at a level between the output voltage of the yellow and the output voltage of the red, and the difference between the reference voltage and the signal voltage is determined by a comparator 364 and is amplified. The difference signal thus amplified is fed through an electrode drive circuit 365 to the control electrode 360a of the ion control electrode. Incidentally, numeral 366 indicates a block signal generator which is operative to feed electric information out of the photoelectric converting element and to take the timing of the electrode drive circuit 365.

In order to sufficiently feed the ion flow to the charge holder thereby to enhance the later-described developing quality, as has been described hereinbefore, it is necessary to set the ion control electrode at an electrically higher potential than the charge holder. If, in this instance, the video signal from the outside of the copying machine is considered to be processed, it is not preferred to set the units including the aforementioned signal processing unit at a high potential but is preferred to set at least the ion control electrode drive circuit as a high potential.

Figure 13:
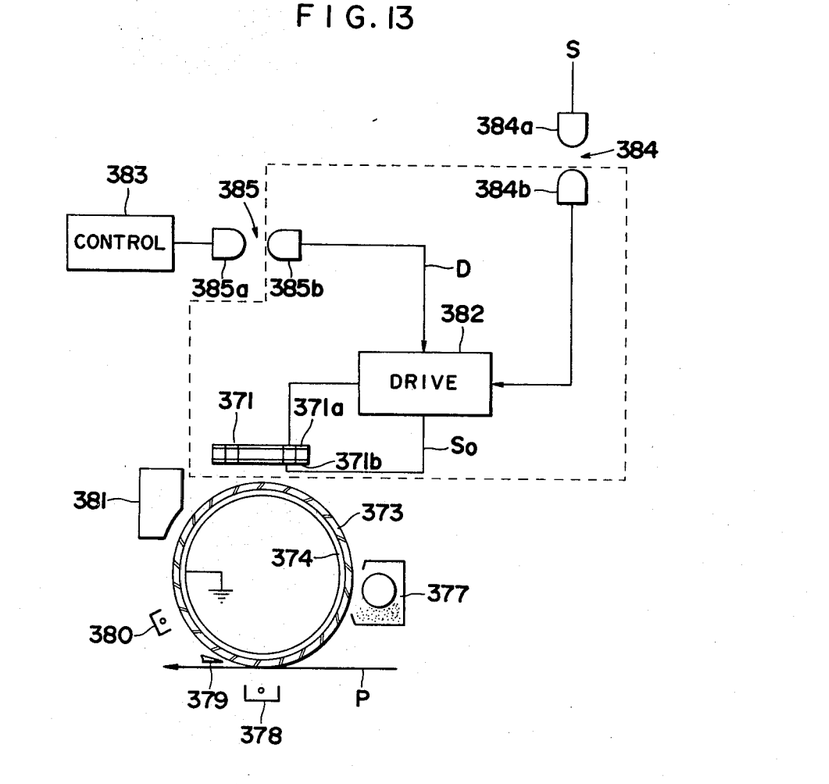
FIG. 13 is a view showing in example of the copying machine using a photo-coupler according to the present invention.

With this point in mind, an embodiment shown in FIG. 13 takes into consideration that there rises no problem if a high voltage is applied between the ion control electrode and the back electrode of the charge holder. This embodiment is constructed such that the back electrode is grounded, that a high voltage is applied to the ion control electrode and that a photo-coupler is used to electrically separate the ion control electrode drive circuit, the video signal processing unit and the drive signal generator. Since with this construction, the back electrode is held at the zero potential, the electric processings for the several units to be arranged around the charge holder are facilitated, and the feed of said drive circuit with the video signal and the drive signal can be performed in a usual electric insulating manner merely by setting only the ion control electrode and its drive circuit at a high potential so that the embodiment under consideration is advantageous both technically and economically. The aforementioned embodiment of the present invention will be further described with reference to FIG. 13. In the embodiment shown, a rotary drum 374 made of a conductive material is used as the back electrode, and a dielectric layer 373 formed on the surface of the former is used as the charge holding layer whereas the back electrode 374 is grounded.

Around the rotary drum 374, there are arranged: a developer 377 for developing an electrostatic latent image which is formed on the dielectric layer 373 by an ion control electrode 371; a transfer electrode 378 for transferring a recorded image after development to the recording paper P; a separating pawl 379 for separating the recording paper P after the transfer out of the dielectric layer 373; a charge removing electrode 380 for removing the charges which are left on the dielectric layer 373 after the separation; and a cleaner 381 for removing the developing agent which is left on the dielectric layer 373. The ion control electrode 371 has its common electrode 371a fed with a high voltage of about 2 KV by a control electrode drive circuit 382 and its control electrode 371b with a recording image signal $S_o$ based upon such a high voltage as a reference as is applied upon the common electrode 371a. The recording image signal $S_o$ is an electric information signal including not only the signal from the aforementioned solid image pickup element but also the output information of a computer or the information to be transmitted through a communication line. The drive signal is a synchronous signal such as a clock signal for determining the timing or the order at or in which the recording image signal $S_o$ is fed to the ion control electrode 371 and is generated by a drive control circuit 383.

Both the recording image signal $S_o$ and the drive signal D thus far described are fed to the drive circuit 382 through high speed photo-couplers 384 and 385, respectively. These photo-couplers are constructed, as is well known in the art, by integrally packaging a light emitting element and a light receiving element, of which the light emitting element is operative to emit a quantity of light according to the input signal and the light receiving element is operative to feed out a signal according to the quantity of light received. In the embodiment being described, the portion surrounded by broken lines, as shown, i.e., the ion control electrode 371 and the drive circuit 382, which is connected with the light receiving portions 384b and 385b of the photocouplers 384 and 385, construct the high voltage system. By feeding the recording image signal S and the drive signal D to the light emitting portions 384a and 385a of the photo-couplers 384 and 385, moreover, the light emitting portions 384a and 385a and the light receiving portions 384b and 385b are electrically separated but are connected through optical transmission. With these arrangements of the units and parts constituting the copying machine, the portion for electrically insulating treatment against the high voltage is sufficiently constructed by the portion indicated by broken lines, and other units, parts and signal transmission system are sufficiently treated by the usual electrical insulating process so that the embodiment being described is advantageous both technically and economically. The photo-couplers are preferred to be those of high speed type having excellent responsiveness, thus making it possible to shorten the recording time period and further to effect the high speed copying operation.

Figure 15:
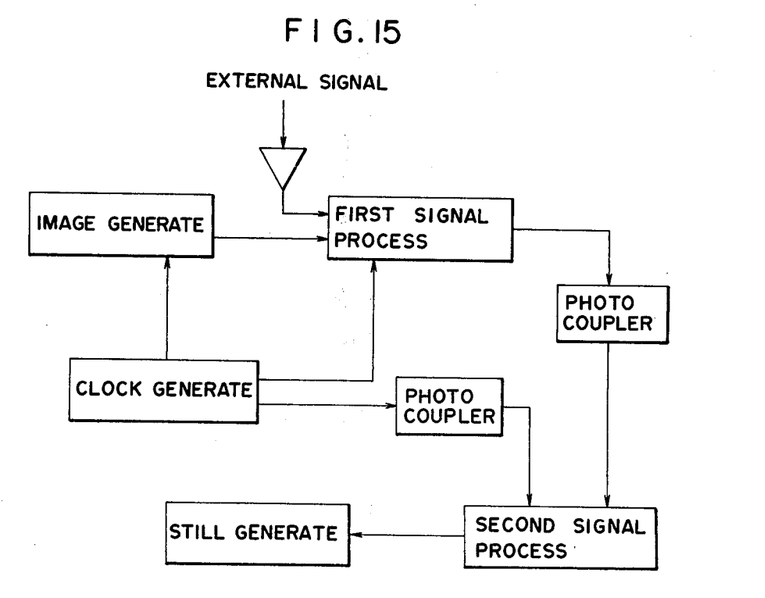
FIG. 15 is a block diagram showing one example of the copying machine according to the present invention.

FIG. 15 is a block diagram showing where the photo-couplers are to be arranged in the control circuit.

Figure 22:
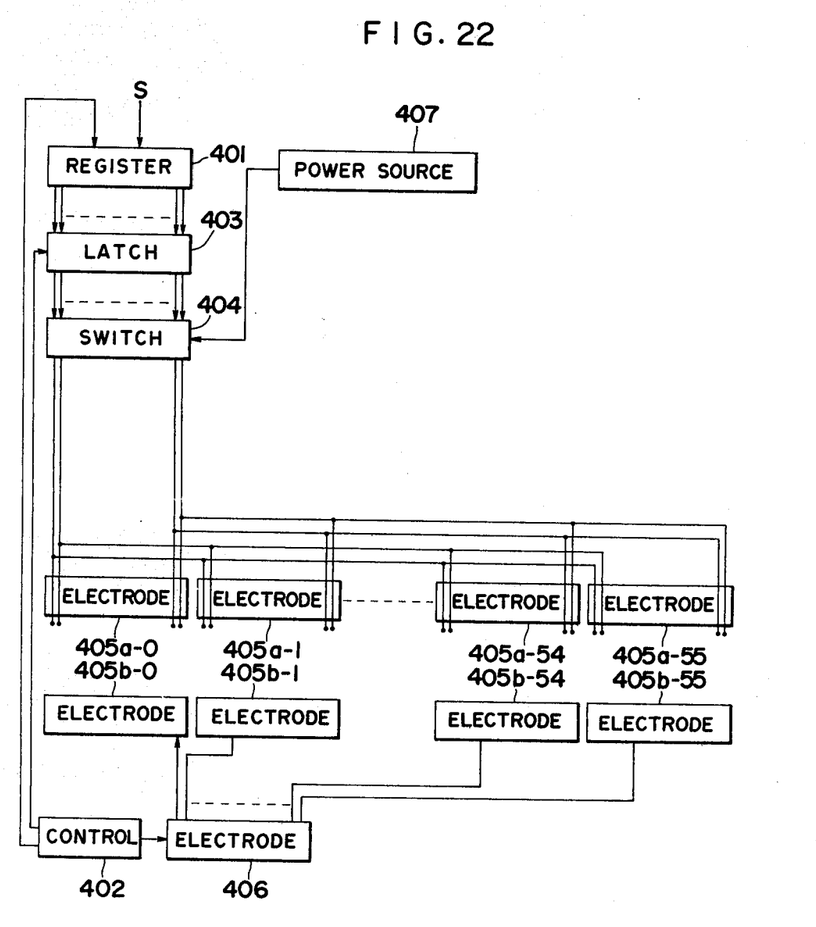

As shown, a first signal processing unit is one which is driven at a low voltage whereas a second signal processing unit is one which is driven at a high voltage. With reference to FIG. 22, more specifically, a not-shown circuit for generating a video signal S is the first signal processing unit, and a shift register 401, a latch 403 and a switching circuit 404 constitute together the second signal processing unit. Moreover, a control circuit 402 for generating the clock signal is also included in the first signal processing unit.

The aforementioned first signal processing unit for generating the video signal S also includes an amplifying circuit for amplifying the signal from the solid image pickup element, a signal processing circuit for scalechanged copying operations, and the comparator 364 shown in FIG. 12 for the contrast adjustment and fog prevention. Incidentally, since only the circuit to be driven by a high voltage is separated by the photo-couplers, as has been described in the above, it is possible in accordance with the combination of the circuit to include the shift register 401 and the latch 403 of FIG. 22 in the first signal processing unit and to include the switching circuit 404 and a common electrode drive circuit 406 in the second signal processing unit.

Figure 16:
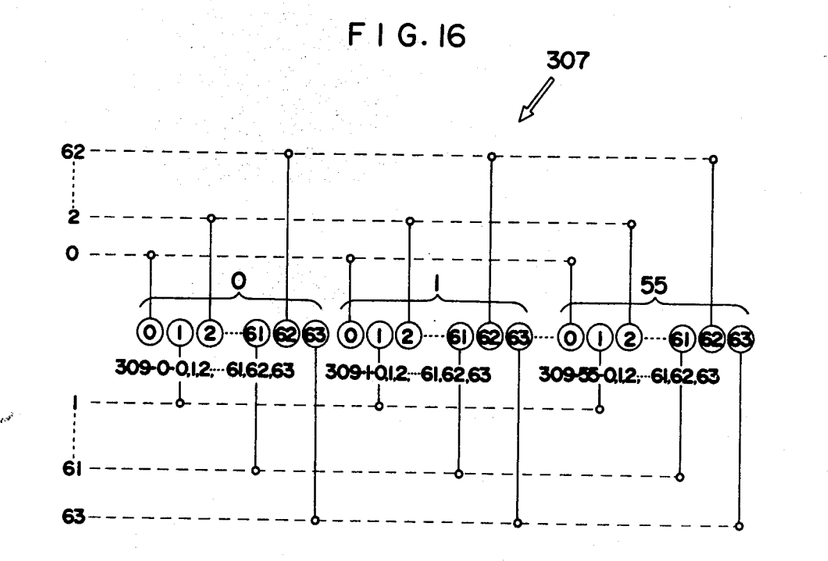
FIGS. 16 and 17 are views showing an example for controlling the ion control electrode in a group manner.
Figure 17:
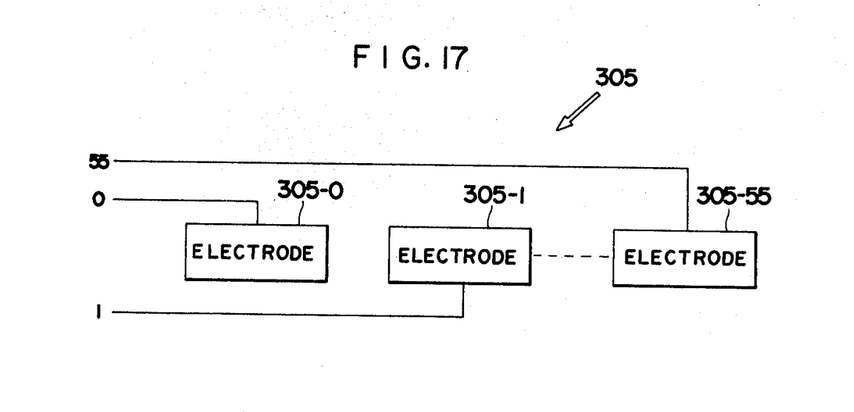
Figure 18:
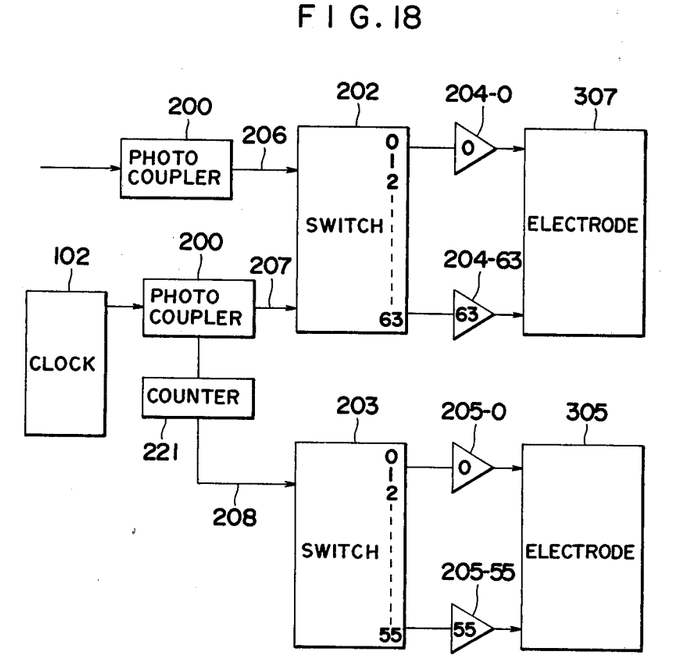
FIG. 18 is a block diagram showing a drive circuit for the group control.

FIGS. 16, 17 and 18 show one wiring method for driving the ion control electrode. By making a matrix at the sides of the control electrode and the common electrode, there is provided one method for reducing the number of wires to the ion control electrode in comparison with that of the second signal processing unit.

FIG. 16 is a wiring diagram at the side of the control electrode 307 of the ion control electrode. The electrodes, which are formed with openings arranged in rows and insulated from one another, are divided into fifty six blocks 0 to 55 each having sixty four numbers 0 to 63, and the electrodes having the common number and belonging to the respective blocks are wired and connected at the side of the common electrode at the back.

FIG. 17 is a wiring diagram at the side of the common electrode 305 of the ion control electrode. The common electrode are also divided in a manner to correspond to the fifty six blocks 0 to 55 and are respectively wired at numerals 0 to 55.

FIG. 18 shows the drive circuit of the ion control electrode.

Numerals 202 and 203 indicate switching elements. The element 202 uses a multiplexer of sixty four channels, which can be replaced by four multiplexers having sixteen channels. The element 203 uses a multiplexer of fifty six channels, which can be replaced by seven multiplexers having eight channels. The voltage video signal from the first signal processing unit is fed through a photo coupler 200 and is consecutively fed out as 206 at the channels 0 to 63 of the multiplexer of the switching element 202 in response to the drive signal 207 which is fed through the photo-coupler 200 of a clock generating unit 102. The respective output signals are amplified by amplifiers 204-0 to 204-63 and are fed to the respective electrodes at the side of the control electrode of the ion control electrode.

On the other hand, the drive signal 207 from the clock generating unit is fed through a counter 221 to the switching element 203 with the multiplexer. The drive signal 208 from the counter 221 drives the multiplexer of the element 203, each time the switching operation of each scanning 0 to 63 of the multiplexer of the element 202, and is also used as the output of the multiplexer of the element 203. This output of the multiplexer of the element 203 is amplified by an amplifier 205 and is fed to each electrode at the side of the common electrode of the ion control electrode.

Figure 19:
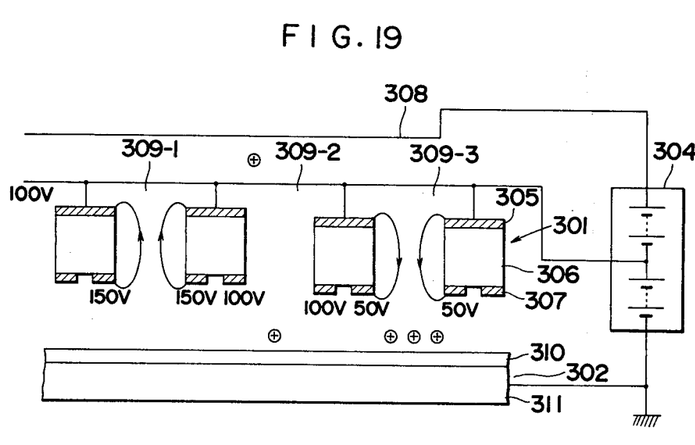
FIGS. 19 and 20 are views showing the modes of the ion current control for explaining the group control.

FIG. 19 shows the state of the control of the ion flow during the drive of the common electrode 305 of the ion control electrode 301. A high voltage is applied between the corona wire 308 and the electrostatic recorder 302 so that the positive ions flow to the electrostatic recorder 302. At the aperture 309 of the ion control electrode 301, as shown in FIG. 19, a potential of −50 V is established at 309-1, a potential of 0 V is established at 309-2, and a potential of +50 V is established at 309-3 so that charges are fed to the surface of the electrostatic recorder 302 at the position 309-3 but no charge fails to reach the surface of the electrostatic recorder 302 at the position 309-1.

Figure 20:
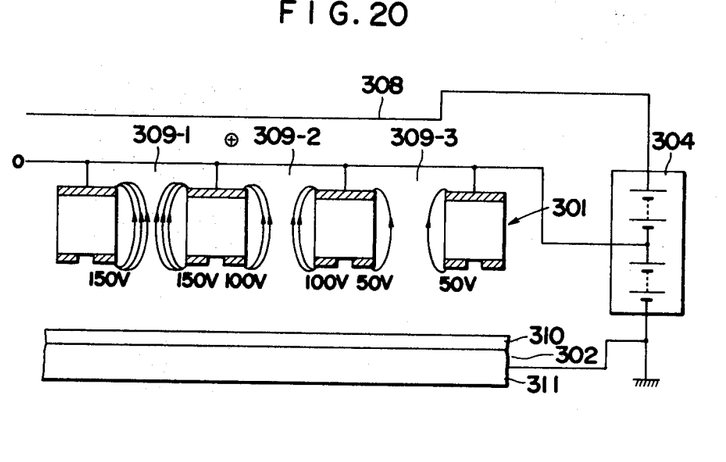

FIG. 20 shows the state of the ion flow control when the common electrode is not driven. As shown, the aperture portions 309-1, 309-2 and 309-3 are all at negative potentials with respect to the electrostatic recorder so that no positive ion can pass through the aperture 309, whereby the electrostatic recorder 302 fails to receive the charges.

As a result, in the wiring shown in FIGS. 16 and 17, the ion flow is sufficiently controlled so that the electrostatic image corresponding to the picture image of the original can be formed on the electrostatic recorder.

The drive method of the ion control electrode, as shown in FIG. 18, is directed to a method for converting the voltage signals, which are amplified to such a voltage as sllows the ion control electrode to sufficiently control the ion flow, into the electrostatic image by consecutively feeding the voltage signals to the electrodes located at the control electrode and formed with the respective aperture portions. In order to increase the writing speed of the electrostatic image forming unit onto the electrostatic recorder, the afore-mentioned voltage signals, which are fed to the electrodes having the respective aperture portions at the side of the control electrode of the ion control electrode, have to be held as long as possible. Preferably, the signals have to be held at the respective electrodes until the subsequent signal is fed whereby the flow rate of the ions toward the electrostatic recorder can be increased.

Figure 21:
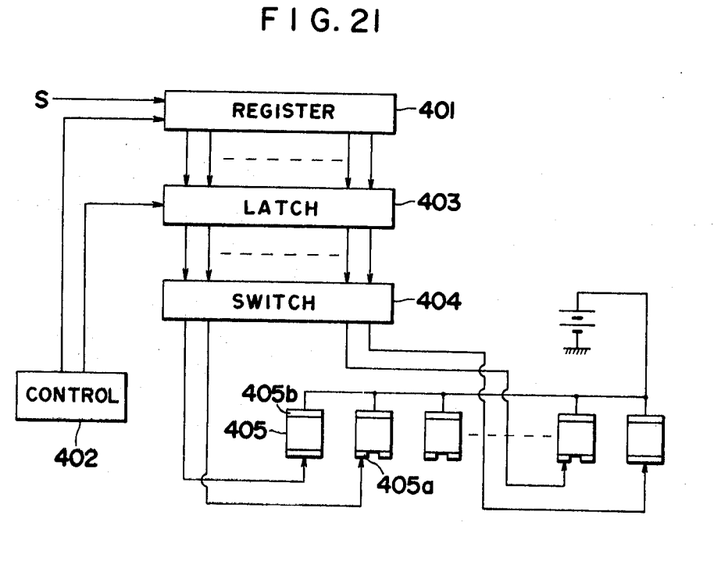
FIGS. 21, 22 and 23 are views showing an example for transferring a serial video signal in parallel to the ion control electrode.

FIG. 21 is a view showing a control circuit, in which the signals to be fed to the respective electrodes at the side of the control electrode of the ion control electrode are held for a certain time period whereby the upper limit of the frequency of the recording signal due to the mobility of the ions in the air is eliminated.

FIG. 21 corresponds to an example, in which all the signals for one scanning line are held.

As shown, the video signal S is held in the latch 403 through the shift register 401 in response to the clock signal coming from the control circuit 402. The video signal thus held is fed, upon each scanning of one line, through the switching circuit 404 to the control electrode 405a of an ion control electrode 405 in a parallel manner. This transfer signal is fed from the control circuit 402.

FIG. 22 shows an example, in which the control electrode and the common electrode of the ion control electrode are divided into plural blocks so that the video signal is held for each block.

The video signal held by the latch 403 is fed to the control electrode 405a in response to the transfer signal coming from the control circuit 402. On the other hand, a common electrode 405b is fed with the signal coming from the common electrode control circuit 406, which is made cooperative with the control circuit 402, i.e., the signal for allowing and blocking the passage of the ions through the aperture of the ion control electrode 405. The operations of the embodiment thus constructed will be described in the following.

The image signals from the switching circuit 404 are fed in parallel to the respective blocks of the control electrodes 405a-0, 405a-1, . . . , 405a-55. From the common electrode 406, on the other hand, a common electrode 405b-0 is first fed with such a signal as allows the passage of the ions at that block. In this instance, the common electrodes of other blocks, i.e., the electrodes 405b-1, . . . , 405b-55 are fed with such a signal as blocks the passage of the ions.

Next, when the video signals, which are held in the latch 403, are fed to the control electrode 405a-1 in response to the transfer signal from the control circuit 402, only the common electrode 405b-1 is fed with such a signal as allows the passage of the ions. These operations are repeated to effect the recording operation of the electrostatic picture image. Numeral 407 indicates a power source circuit for the switching circuit.

Figure 23:
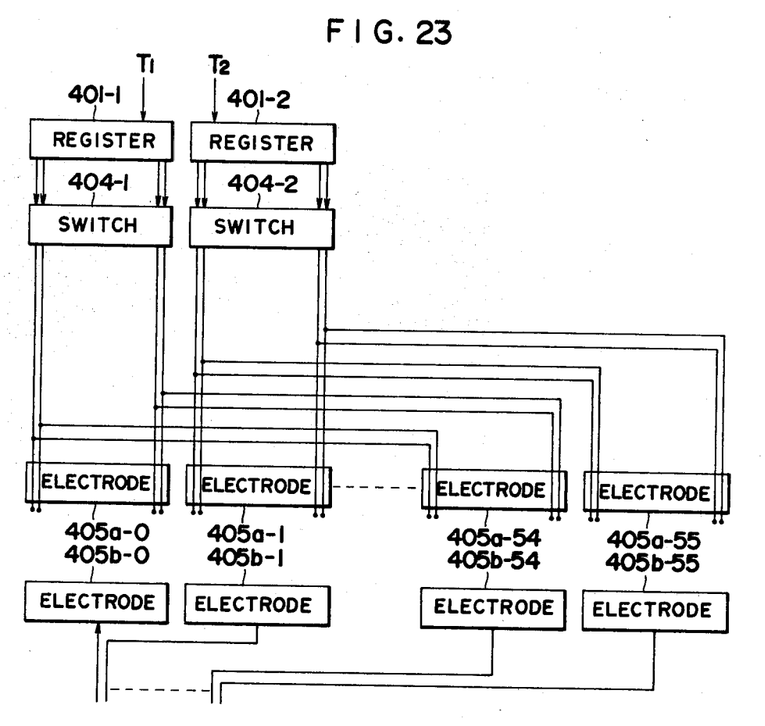

FIG. 23 shows a further embodiment of the present invention. In this embodiment, shift registers 401-1 and 401-2 are used so that the video signals serially coming are alternately held in the respective shift registers whereby the video signals thus held are transferred in parallel to the control electrode 405a. More specifically, the video signals held in the shift registers 401-1 and 401-2 are transferred in an alternating manner to switching circuits 404-1 and 404-2, respectively, in response to transfer signals $T_1$ and $T_2$. The operations of the common electrodes 405b-0, . . ., 405b-55 are similar to those of the embodiment shown in FIG. 22.

Figure 24:
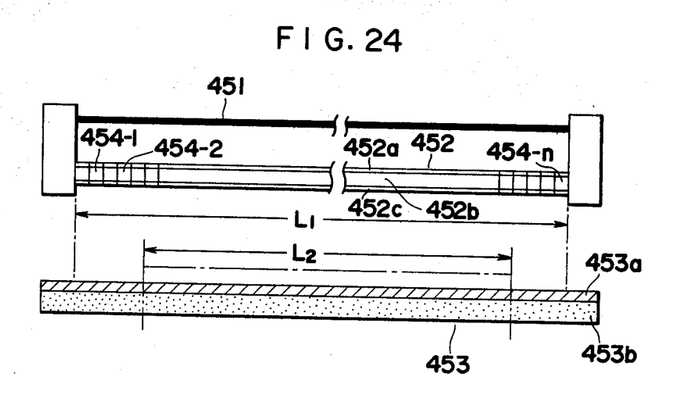
FIG. 24 is a view showing one example of the present invention, in which the relationship between the length of the ion control electrode and the copy width is adjusted.

FIG. 24 is a view showing the embodiment of the ion generating unit which eliminates the difference in the quality of the picture image between the center and end portions of the picture image.

As shown, the ions from a corona discharge wire 451 pass through the apertures 454-1, 454-2, . . ., 454-n of an ion control electrode 452 until they reach a charge holder 453. The control electrode 452c of the ion control electrode 452 allows and blocks the passage of the ions through the apertures 454-1 to 454-n.

Numerals 452a and 452b indicate a common electrode and an insulating layer, respectively. Here, it has been found that the flow of the ions at the end portion of the ion control electrode 452 is not identical to that at the center portion thereof and that the quality of the picture image obtainable may be difference from that at the center portion.

In the present embodiment, therefore, the length $L_1$ of the ion control electrode 452 is made sufficiently larger than the maximum width $L_2$ of the copy paper thereby to prevent the quality of the image at both the end portions from being deteriorated. Incidentally, in case the charge holder itself is a recording medium, the width of this medium is made to have a smaller value $L_2$ than the length $L_1$ of the ion control electrode 452.

What is claimed is:

1. In a copying machine comprising an image signal generating unit including an image pickup element for converting an optical image of an original into an electrical signal, an ion generating source, an electrostatic image forming unit including a charge flow control device which comprises control electrode means and common electrode means facing each other through a layer of electrically insulating material, said electrode control means comprising at least one row of mutually electrically insulated control electrodes, said charge flow control device having a plurality of fine openings therethrough with one opening extending through each of said control electrodes, and control means applying a first control voltage to said control electrode in accordance with the signal derived from said signal generating unit to control the charge flow through said openings to form an electrostatic image upon a charge holder, the improvement comprising forming said common electrode means of at least two mutually electrically insulated electrodes with each common electrode being positioned opposite a different group of control electrodes, and means deriving a second control voltage applied to said common electrodes for controlling the flow of ions from the control electrodes in the group opposite that common electrode.

2. In a copying machine, the improvement according to claim 1, in which the image signal generating unit includes an optical system for focusing a light bearing the picture image of an original upon said image pickup element, and in which the control means includes a driving circuit for driving the image pickup element.

3. In a copying machine, the improvement according to claim 2, in which the optical system and the image pickup element are formed as a single unit moving together.

4. In a copying machine, the improvement according to claim 1, in combination with means controlling the voltage level to be applied to the common electrode.

5. In a copying machine, the improvement according to claim 4, in combination with means producing a pre-set reference voltage corresponding to a color to be recorded, and in which the first control voltage corresponds to the difference between said reference voltage and the said signal voltage.

* * * * *